(12) United States Patent
Walker et al.

(10) Patent No.: US 7,749,456 B2
(45) Date of Patent: Jul. 6, 2010

(54) APPARATUS FOR THE MANUFACTURE OF CARBON MICROBALLOONS

(75) Inventors: Terence B. Walker, South Bend, IN (US); Laurie A. Booker, South Bend, IN (US)

(73) Assignee: Honeywell International Inc., Morristown, NJ (US)

( * ) Notice: Subject to any disclaimer, the term of this patent is extended or adjusted under 35 U.S.C. 154(b) by 917 days.

(21) Appl. No.: 11/495,707

(22) Filed: Jul. 31, 2006

(65) Prior Publication Data

US 2010/0143214 A1 Jun. 10, 2010

Related U.S. Application Data

(62) Division of application No. 10/223,936, filed on Aug. 20, 2002, now Pat. No. 7,105,141.

(51) Int. Cl.
*B01J 8/02* (2006.01)
*B01J 19/32* (2006.01)

(52) U.S. Cl. .................. 422/129; 422/164; 422/198; 422/240; 220/552

(58) Field of Classification Search ............ None
See application file for complete search history.

(56) References Cited

U.S. PATENT DOCUMENTS

| | | | |
|---|---|---|---|
| 2,077,220 A * | 4/1937 | Conway | 249/128 |
| 2,257,377 A * | 9/1941 | Haben | 249/126 |
| 2,673,812 A | 3/1954 | Greaves et al. | |
| 3,009,863 A | 11/1961 | Angevine | |
| 3,446,593 A | 5/1969 | Moutaud et al. | |
| 3,470,275 A | 9/1969 | Ban | |
| 3,475,278 A | 10/1969 | Peters et al. | |

(Continued)

FOREIGN PATENT DOCUMENTS

EP 16576 A1 10/1980

(Continued)

OTHER PUBLICATIONS

Chemical Abstracts, vol. 115, No. 052846, 1991, pp. 188, XP000252109.

*Primary Examiner*—Jennifer A Leung
(74) *Attorney, Agent, or Firm*—Birch, Stewart, Kolasch & Birch, LLP

(57) ABSTRACT

This invention provides a stepped heating cycle for the pretreatment of phenolic microballoons prior to carbonization thereof, wherein the heating cycle comprises the steps of sequentially: gradually elevating the temperature of the microballoons to a temperature in the range 100° C.-170° C.; holding the microballoons at the elevated temperature for 1-24 hours; and gradually cooling the microballoons. This invention also provides a heat-dissipation reactor (11, 21, 31) which comprises a walled reaction chamber having a bottom and no top, the reaction chamber being fitted with high thermal conductivity inserts. When used in accordance with this invention (61), the volume within the walls of the reaction chamber is charged with phenolic resin microballoons. In a preferred embodiment, the reaction chamber (11, 21) is subdivided into a plurality of subchambers by a vertical grid of aluminum plates (19, 29). In this embodiment, about half or more of the wall area of each subchamber comprises aluminum and a top edge (17) of the aluminum wall material communicates with atmosphere above the reaction chamber.

2 Claims, 3 Drawing Sheets

U.S. PATENT DOCUMENTS

| | | |
|---|---|---|
| 3,638,930 A | 2/1972 | Hart |
| 3,922,334 A | 11/1975 | Marek et al. |
| 4,229,425 A | 10/1980 | Shaver et al. |
| 4,279,702 A | 7/1981 | Shaver et al. |
| 4,444,894 A | 4/1984 | Shaver |
| 4,996,009 A | 2/1991 | Hasegawa |
| 5,232,772 A | 8/1993 | Kong |
| 5,752,821 A | 5/1998 | Jo |
| 5,945,084 A | 8/1999 | Droege |

FOREIGN PATENT DOCUMENTS

| | | |
|---|---|---|
| EP | 0 846 929 A2 | 10/1998 |
| EP | 0 846 929 A3 | 4/1999 |
| GB | 2291787 A * | 2/1996 |

* cited by examiner

APPARATUS FOR THE MANUFACTURE OF CARBON MICROBALLOONS

This application is a division of application Ser. No. 10/223,936, which was filed on Aug. 20, 2002, and which has issued as U.S. Pat. No. 7,105,141 B2. This application claims the benefit under 35 USC §120 of application Ser. No. 10/223,936. The entire contents of application Ser. No. 10/223,936 are incorporated by reference in the present application.

FIELD OF THE INVENTION

This invention relates to a pyrolytic process for the batch manufacture of hollow carbon microballoons. This invention also provides an apparatus that is especially advantageous for use in the process of the invention.

BACKGROUND OF THE INVENTION

Carbon microballoons are employed as low density filler for thermal insulating materials, for instance, polyimides.

In order to decompose a formed degradable material such as a phenolic resin microballoon into carbon and recover the carbon structure intact, the heating and cooling steps of the process must be controlled, in an inert atmosphere, as to temperature, temperature gradient, and time.

U.S. Pat. No. 4,229,425 describes a process in which a continuously heated oven is lined with a muffle comprising an elongated quartz ceramic tube which is heated to raise its temperature to or above the carbonizing temperature of preformed degradable microballoon material. The patent indicates that the degradable microballoon material may be polymers of alkyd or phenol resins or polyurethanes.

The muffle tube glows and transfers heat by radiation to a graphite boat which contains the degradable microballoons to be pyrolyzed. The muffle is heated from the outside in an oxygen atmosphere, but the inside of the muffle is flushed with an inert gas such as nitrogen so that the boat containing the degradable microballoons experiences a continuously changing inert atmosphere. Once the muffle is heated, it is said to be necessary to keep it heated continuously, since it will crack if it is allowed to cool. Therefore the microballoons must be fed into the muffle and removed therefrom as quickly as possible so that the muffle is not seriously cooled by opening it at one end.

Dwell time in the muffle of the graphite boat containing the microballoons is dictated by the necessity of heating the microballoons slowly enough so that they do not simply burst as a result of rising internal gas pressure. The walls of the microballoons are microporous, and gases can diffuse therethrough if the temperature of the batch is raised at a slow enough rate. The boat not only limits the rate of heating of the microballoons but also acts as a sacrificial material which is attacked by oxidizing gases and moisture given off as the microballoons are heated.

According to U.S. Pat. No. 4,229,425, the decomposition heating process takes about four hours, after which time period one end of the muffle is opened and the boat is removed and immediately placed in a second, unheated chamber which is also provided with an inert atmosphere, so that the microballoons and the boat are not oxidized before they can cool below the auto-ignition temperature of carbon microballoons in air. The second chamber also reduces the rate of heat loss through radiation so that the carbonized material cools at a rate which will prevent cracking or deterioration thereof.

The carbon microballoons which result from decomposition are then recovered from the cooled boat, are screened in order to break up any agglomeration of the particles, and are then immediately packaged in airtight containers to keep them out of contact with moisture in the atmosphere. These microballoons are filled with nitrogen at the time when they are removed from the cooling chamber as a result of the processing steps described.

U.S. Pat. No. 4,229,425 indicates that efforts to speed up the process by shortening the heating period of the microballoons has resulted in a lower yield of intact carbon microballoons due to rupturing of the spherical form, cracking, oxidizing, etc. The patent claims a batch process for manufacturing carbon microballoons which includes the steps:

(a) heating a first chamber to a temperature which is above the carbonizing temperature of the porous-walled heat carbonizable microballoon precursor material and within the range 2000-3000° F. (1093-1649° C.) and continuously maintaining the temperature at that level;

(b) enclosing a batch of microballoons within a graphite boat which surrounds the microballoons except for small openings sufficient to pass gases through the boat;

(c) containing and heating the boat and batch in the heated first chamber for about 4 hours while flushing the chamber with an inert gas and until the batch is carbonized to form microballoons; and (d) removing the heated batch from the first chamber and immediately confining it in a second unheated chamber, and flushing the second chamber with an inert gas until the batch cools below its self-ignition temperature in air.

As compared to the process described in U.S. Pat. No. 4,229,425, the present process—which comprises an intermediate cure routine—provides carbon microballoons with less breakage and ultimately enables the manufacture of a better foam product.

BRIEF DESCRIPTION OF THE DRAWINGS

The drawings that accompany this application are presently solely for the purpose of illustrating certain aspects of the present invention. They are not to scale and are not intended to limit the invention in any way.

SUMMARY OF THE INVENTION

Figure 1:
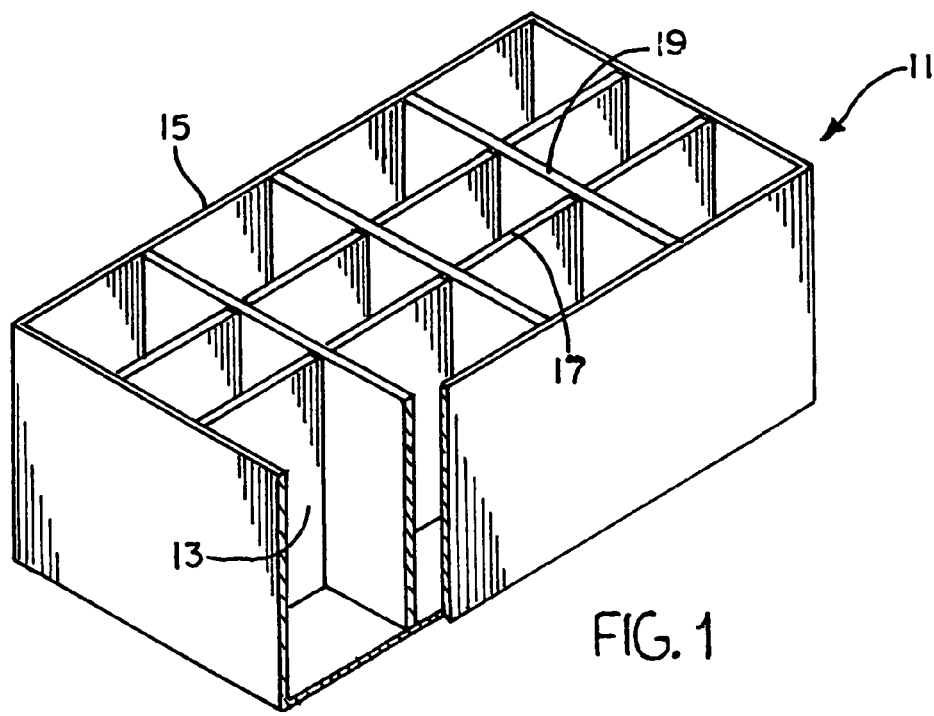
FIG. 1 is a cut away perspective sketch of an embodiment of the heat-dissipation reactor of the invention.

The present invention provides a method for manufacturing carbon microballoons that show significantly reduced cracking as compared to carbon microballoons produced by methods that do not make use of the pre-treatment prior to carbonization described herein. Carbon microballoons produced in accordance with the present invention consequently also provide substantial improvement in compressive strength when used as fillers in composites.

This invention provides a stepped heating cycle for the pre-treatment of phenolic microballoons prior to carbonization thereof, wherein the heating cycle comprises the steps of sequentially: gradually elevating the temperature of the microballoons to a temperature in the range 100° C.-170° C.; holding the microballoons at the elevated temperature for 1-24 hours; and gradually cooling the microballoons. This invention also provides a heat-dissipation reactor which comprises a walled reaction chamber having a bottom and no top, the reaction chamber being fitted with high thermal conductivity inserts. When used in accordance with this invention, the volume within the walls of the reaction chamber is charged with phenolic resin microballoons.

A processing embodiment of the present invention is a stepped heating cycle for the pre-treatment of phenolic microballoons prior to carbonization thereof. This heating cycle comprises the steps of sequentially: raising the temperature of the microballoons to approximately 140° C. over a period of about 8 hours; holding the microballoons at approximately 140° C. for about 10 hours; cooling the microballoons over a period of about 5 hours to a temperature of approximately 40° C.; raising the temperature of the microballoons to approximately 140° C., over a period of about 5 hours; holding the microballoons at approximately 140° C. for about 10 hours; raising the temperature of the microballoons to approximately 150° C. over a period of about 1 hour; holding the microballoons at approximately 150° C. for about 20 hours; and cooling the microballoons for about 5.5 hours to approximately 40° C.

In accordance with another aspect of this invention, phenolic resin microballoons that have been pre-treated in this way are removed from the heat-dissipation reactor, placed into a graphite reactor, and heated in an inert atmosphere to convert the phenolic microballoons into carbon microballoons. Thus, another embodiment of the present invention contemplates protecting microballoons from combustion by processing them in a heat-dissipation reactor made in accordance with this invention.

A heat-dissipation reactor of the present invention includes a walled reaction chamber having a bottom and no top. The reaction chamber is subdivided into a plurality of subchambers—for instance, by a vertical grid of aluminum plates—so that about half or more of the wall area of each subchamber is made of highly thermally conductive material. Generally, in use, the subchambers are charged almost fully with phenolic resin microballoons. However, the top edges of the highly thermally conductive wall materials extend above the charge of microballoons and are in contact with the atmosphere above the reaction chamber.

While a grid of aluminum plates provides a convenient means to implement the present invention, the reaction chamber may contain other sorts of structural elements composed of highly thermally conductive material to dissipate heat. For instance, vertical tubing or pipes (i.e., hollow cylindrical configurations) made of aluminum or some other heat-dissipating material may be used instead of a grid. In this embodiment of the present invention, these structural elements are arranged so that no point of volume within the walls of said reaction chamber is further than about 5 inches from one of said structural elements. As with the grid embodiments, the top edges of the highly thermally conductive structural element materials are generally allowed to communicate with atmosphere above the reaction chamber when the reaction chamber is charged with phenolic resin microballoons.

DETAILED DESCRIPTION OF THE INVENTION

The Process

One aspect of the present invention provides a batch process for manufacturing carbon microballoons. The process of this invention includes the step of loading commercially available cured phenolic resin microballoons into a heat-dissipation reactor designed in accordance with the present invention. Heat-dissipation reactors contemplated by the present invention are described in detail hereinbelow. The heat-dissipation reactor with its charge of phenolic microballoons is then loaded into a furnace, where it is subjected to a stepped heating cycle.

The stepped heating cycle that is used in the present invention comprises raising the temperature of the microballoons to approximately 140° C. over a period of about 8 hours, holding at that temperature for about 10 hours, cooling for about 5 hours to a temperature somewhat above ambient temperature, e.g., about 40° C., again raising the temperature of the microballoons to approximately 140° C., this time over a period of about 5 hours, holding the temperature at approximately 140° C. for about 10 hours, raising the temperature to approximately 150° C. over a period of about 1 hour, holding at that temperature for about 20 hours, and finally cooling for about 5.5 hours to close to ambient temperature, e.g., about 40° C.

Once the phenolic microballoons have been pre-treated in this manner, they are ready to be removed from the heat-dissipation reactor, placed into a graphite reactor, and heating in an inert atmosphere to convert them into carbon microballoons. This aspect of the conversion of phenolic microballoons may be carried out in a manner that is in general known to those skilled in the art. For instance, phenolic microballoons that have been pre-treated in accordance with this invention may be charged into a graphite reactor which is then placed into a furnace supplied with an inert atmosphere, e.g., nitrogen gas.

Carbonization of the phenolic microballoons may be accomplished by a stepped heating cycle, in which the microballoons are heated to 300° C. over a period of 5 hours, from 300 to 435° C. over a period of 6.75 hours, from 435 to 650° C. over a period of 14.3 hours, from 650 to 710° C. over a period of 3 hours, and from 710 to 810° C. over a period of 1 hour, at which point the temperature is maintained at 810° C. until the phenolic microballoons are completely converted into carbon microballoons.

The newly formed carbon microballoons may be heat-treated by heating the graphite reactor containing them in the furnace supplied with an inert atmosphere to 1800° C. and maintaining them at that temperature for 4 hours. The carbon microballoons may then be removed from the furnace, cooled to ambient temperature, and subsequently used as low density filler for thermal insulating materials, such as polyimides.

The Reactor

Figure 2:
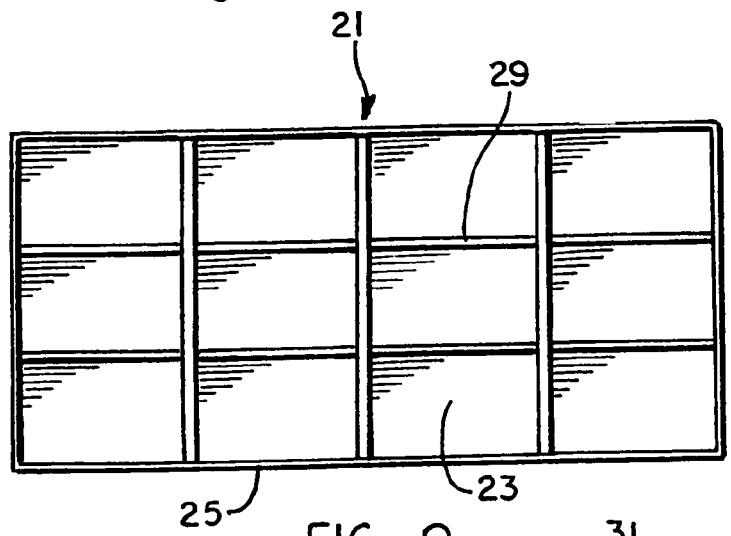
FIG. 2 is a top plan view of the heat-dissipation reactor embodiment of this invention shown in FIG. 1.
Figure 3:
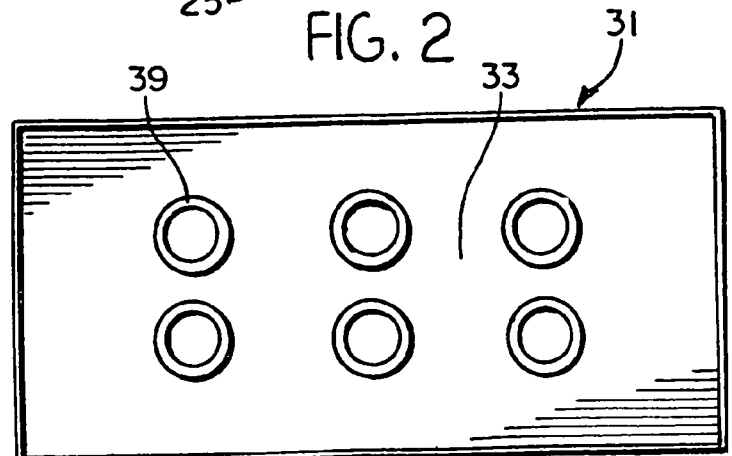
FIG. 3 is a top plan view of an alternate configuration for a heat-dissipation reactor in accordance with this invention.

Another aspect of the present invention is a heat-dissipation reactor, which may be employed to carry out the process of this invention. The heat-dissipation reactor of this invention is illustrated in FIGS. 1-3. The heat-dissipation reactor (11, 21, 31) comprises a walled reaction chamber (15, 25, 35) having a bottom and no top. This reaction chamber can be made from metals such as steel or from alloys. One material which has been found to be useful for making the bottom and sidewalls of the reaction chamber is inconel, an iron-nickel alloy. The reaction chamber contains structural elements (19, 29, 39) composed of highly thermally conductive material.

Aluminum is the preferred highly thermally conductive material, but any material which has sufficient thermal conductivity, to remove enough of the heat generated by exothermic processes occurring within reactants in the reaction chamber so that they do not spontaneously oxidize, may be employed. Copper, graphite, and carbon-carbon composites could also be used as the highly thermally conductive material, as could any solid phase material having a thermal conductivity higher than 10 watts/meter K. Aluminum, for instance, has a thermal conductivity of approximately 220 watts/meter-K.

In accordance with this invention, these highly conductive structural elements are arranged so that no point of volume (13, 23, 33) within the walls of said reaction chamber is further than about 5 inches from one of said structural elements (19, 29, 39). This will ensure that the phenolic microballoons that fill the volumes within the reaction chamber are not too far removed from the highly conductive structural elements to dissipate heat to them. Also, in order to dissipate heat, the top edges (17) of the highly thermally conductive structural element materials communicate with atmosphere above the reaction chamber. Some heat is also conducted by the highly conductive structural elements into the walls and bottom of the reaction chamber.

Referring to FIGS. 1 and 2, a preferred heat-dissipation reactor (11, 21) comprises a walled reaction chamber (15, 25). The walls of the reaction chamber may be of any convenient dimensions. They may, for example, range from 0.1 to 0.25 inches in thickness, and be from 24 to 40 inches in length, 15 to 25 inches in width, and 10 to 20 inches in depth. The reaction chamber is subdivided into a plurality of subchambers, for example by a vertical grid of aluminum plates. Where the walls of the reaction chamber are 0.140 inches thick and measure 34.675 inches in length, 19.25 inches in width, and 13.25 inches in depth, the reaction chamber may be fitted with a grid composed, for example, of two 34-inch long aluminum sheets crossed at right angles by three 18.625-inch long aluminum sheets, the aluminum sheets being 0.625 inches thick and 12 inches wide. This configuration provides reaction subchambers that are approximately 8 inches long, 6 inches wide, and 12 inches deep. In this embodiment, about half (that is, 2 out of 4) or more (that is, 3 out of 4 or 4 out of 4) of the wall areas of each subchamber is formed of aluminum. This is because, for the outer corners, 2 out of 4 subchamber walls are highly conductive, for the remaining exterior subchambers, 3 out of 4 walls are highly conductive, and for the internal subchambers, 4 out of 4 walls are highly conductive.

Figure 4A:
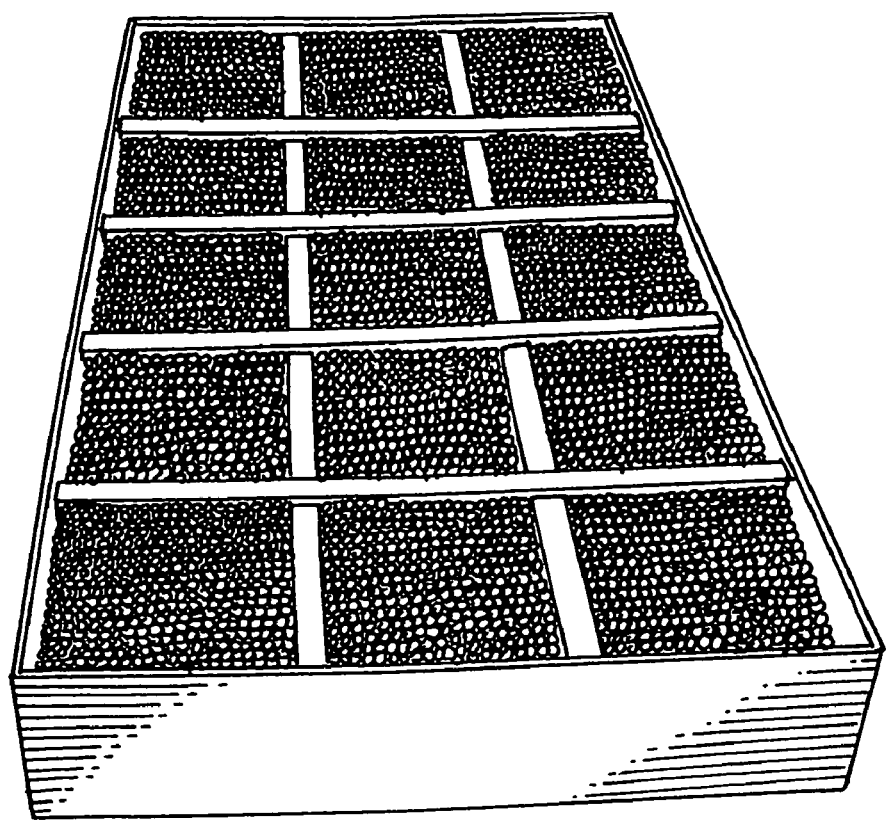
FIGS. 4A and 4B are perspective views of a heat-dissipation reactor charged with phenolic resin microballoons in accordance with this invention.
Figure 4B:
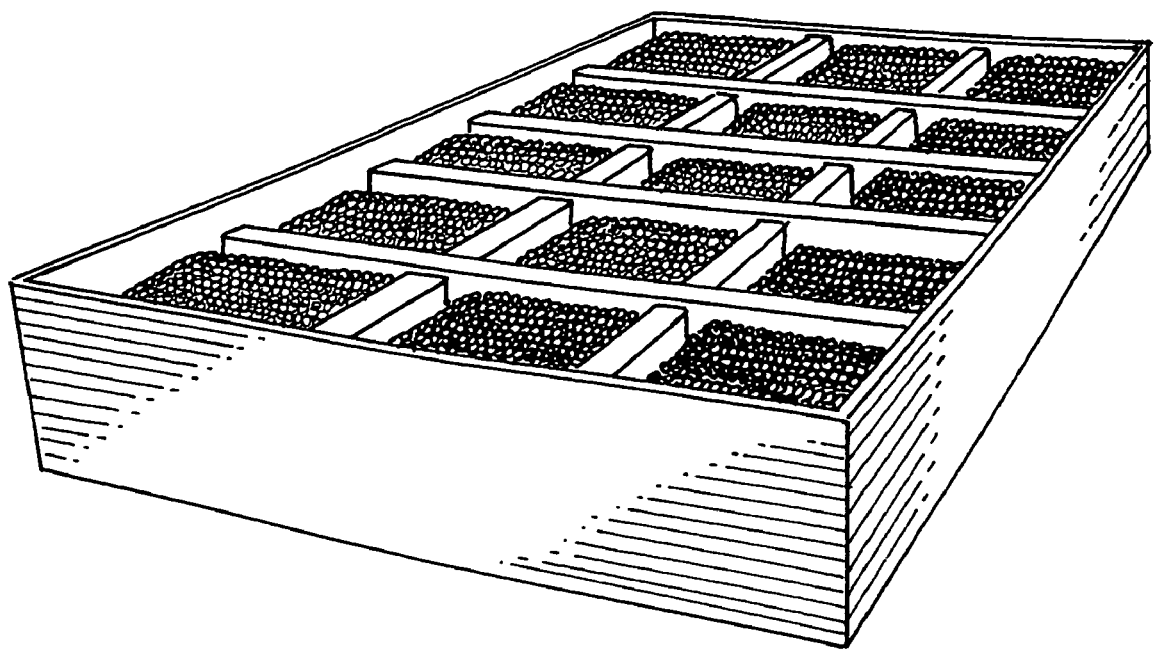

FIGS. 4A and 4B are perspective views of a heat-dissipation reactor charged with phenolic resin microballoons in accordance with this invention. As can be seen in FIGS. 4A and 4B, the phenolic resin microballoons are more or less evenly distributed within the volumes defined by the 15 subchambers into which the reactor volume is divided by the grid, and the top edge of the grid of highly conductive material is exposed to the atmosphere above the reactor.

Figure 5B:
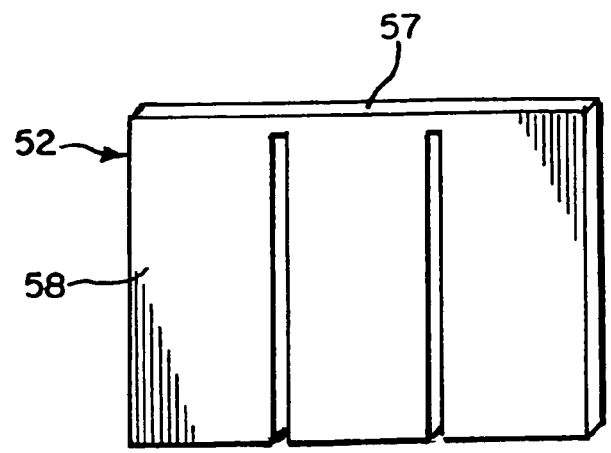
FIGS. 5A and 5B are perspective sketches of grid elements that may be used together to manufacture a heat-dissipation reactor in accordance with this invention.
Figure 5A:
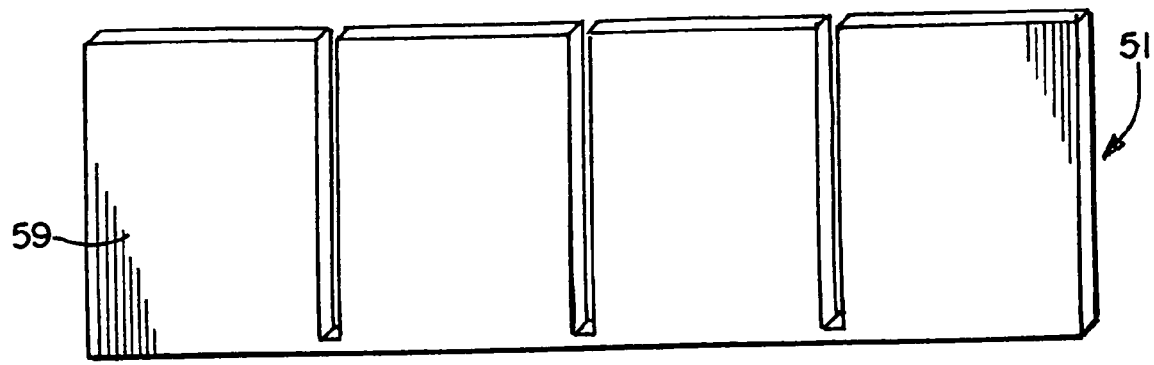

FIGS. 5A and 5B are perspective sketches of grid elements that may be used together in the manufacture of a heat-dissipation reactor in accordance with this invention. In FIG. 5A, bottom element 51 comprises highly conductive structural element 59. In FIG. 5B, top element 52 comprises highly conductive structural element 58. To make a heat-dissipation reactor such as that depicted in FIG. 4, four top elements 52 are interlocked with two bottom elements 51 to form a grid, and the grid is located within a walled reaction chamber. In this way, top edges 57, indicated in FIG. 5B, will be exposed to the atmosphere at the top of the heat-dissipation reactor.

Figure 6:
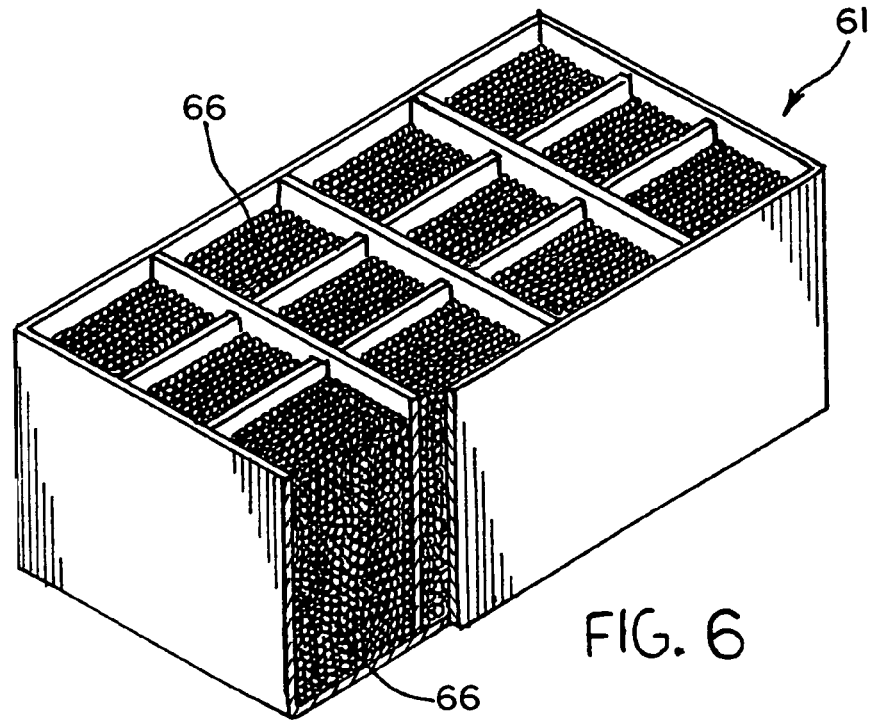
FIG. 6 is a cut away perspective sketch of an embodiment of the heat-dissipation reactor of the invention charged with phenolic resin microballoons.

FIG. 6 illustrates a charged heat dissipation reactor embodiment of the present invention. Charged reactor 61 is similar to that depicted in FIGS. 1 and 2. In the embodiment of this invention depicted in FIG. 6, the volumes within the walls of the reaction chamber (including, e.g., points 13 and 23 in FIGS. 1 and 2, respectively) are charged with phenolic resin microballoons 66.

COMPARATIVE EXAMPLE

Approximately 40 pounds of phenolic microbeads are loaded into a reaction chamber having four walls and a bottom but no top. The reaction chamber is made of inconel alloy 0.140 inches in thickness and measures 34.675 inches in length, 19.25 inches in width, and 13.25 inches in depth. The reaction chamber with its phenolic microbeads is placed into a furnace, and the furnace is heated to 140° C. using a stepped cycle, as follows: the temperature of the furnace and its contents is raised from 30 to 100° C. over a period of 4 hours, then is raised from 100 to 140° C. over a period of 4 hours, then is held at 140° C. for 10 hours, and finally is cooled to 40° C. over a period of 5 hours. Upon opening the furnace, it is observed that the phenolic microbeads in the reaction chamber have reached a temperature above 300° C. and ignited on contact with air.

Example of the Invention

Approximately 40 pounds of phenolic microbeads are loaded into a reaction chamber having four walls and a bottom but no top. The reaction chamber is made of inconel alloy 0.140 inches in thickness and measures 34.675 inches in length, 19.25 inches in width, and 13.25 inches in depth. The reaction chamber is fitted with a grid composed of aluminum sheets 0.625 inches in thickness and having a depth of 12 inches. The grid is made up of two 34-inch lengths of aluminum and three 18.625-inch lengths of aluminum, arranged to provide isolation volumes approximately 8 inches long, 6 inches wide, and 12 inches deep. The charge of phenolic microbeads is distributed more or less evenly among the twelve isolation volumes that are formed by the grid within the reaction chamber. The gridded reaction chamber with its phenolic microbeads is placed into a furnace, and the furnace is heated to 140° C. using a stepped cycle, as follows: the temperature of the furnace and its contents is raised from 30 to 100° C. over a period of 4 hours, then is raised from 100 to 140° C. over a period of 4 hours, then is held at 140° C. for 10 hours, and finally is cooled to 40° C. over a period of 5 hours. Upon opening the furnace, it is observed that the phenolic microbeads in the reaction chamber did not combust and were ready to be carbonized.

What is claimed is:

1. A heat-dissipation reactor having dimensions suitable for the manufacture of hollow carbon microballoons from phenolic microballoon precursors, which reactor comprises a walled reaction chamber having a bottom and no top, wherein the walls and bottom of said reaction chamber are made of steel or another iron alloy, said walls ranging from 24 to 40 inches in length, from 15 to 25 inches in width, and from 10 to 20 inches in depth in order to accommodate said phenolic microballoon precursors, said reaction chamber containing structural elements composed of highly thermally conductive aluminum material in the form of a vertical grid of aluminum plates, wherein said structural elements are arranged so that no point of volume within the walls of said reaction chamber is further than about 5 inches from one of said structural elements and wherein top edges of said highly thermally conductive structural element materials communicate with atmosphere above said reaction chamber.

2. The heat-dissipation reactor of claim 1, wherein the walls and bottom of said reaction chamber are made of an iron-nickel alloy.

* * * * *